United States Patent

[11] 3,552,712

| [72] | Inventor | Carl H. Whitlock |
| | | Key Largo, Fla. |
| [21] | Appl. No. | 809,594 |
| [22] | Filed | Mar. 24, 1969 |
| [45] | Patented | Jan. 5, 1971 |
| [73] | Assignee | Whitlock, Inc. |
| | | Farmington, Mich. |
| | | Continuation-in-part of application Ser. No. 481,231, Aug. 20, 1965, now abandoned. |

[54] COLLAPSIBLE TUBE VALVE
1 Claim, 6 Drawing Figs.

| [52] | U.S. Cl. | 251/5 |
| [51] | Int. Cl. | F16k 7/07 |
| [50] | Field of Search | 251/4, 5; 103/44D, 148; 138/(Inquired) |

[56] References Cited
UNITED STATES PATENTS

| 2,467,150 | 4/1949 | Nordell | 251/5X |
| 2,627,874 | 2/1953 | Johnson | 251/5 |
| 2,641,282 | 6/1953 | Hazlett | 251/5 |
| 2,795,390 | 6/1957 | Laurenty | 251/5 |
| 2,884,963 | 5/1959 | Erndt | 251/5X |
| 3,062,153 | 11/1962 | Losey | 103/44D |

*Primary Examiner*—William F. O'Dea
*Assistant Examiner*—Richard Gerard
*Attorney*—Cullen, Settle, Sloman & Cantor ABSTRACT: A pressure collapsible, resilient valve tube having thick wall end portions with a thin wall intermediate valving portion provided with inwardly directed, integral ribs, wherein application of uniform pressure to the exterior of the valving portion progressively collapses it longitudinally and radially inwardly between the ribs to close the valve.

PATENTED JAN 5 1971 3,552,712

INVENTOR
CARL H. WHITLOCK
BY Cullen, Sloman, & Cantor
ATTORNEYS 3,552,712

COLLAPSIBLE TUBE VALVE

PARENT APPLICATION

This application is a continuation in part of Ser. No. 481,231 filed Aug. 20, 1965, now abandoned.

BACKGROUND OF INVENTION

It is conventional to use collapsible tube valves to control and shut off the flow of dry particulate material flowing at high velocity through pipes. For example, in order to mix various types of molding plastics, which come in the form of granular, particulate and flake materials, such materials are vacuum flowed from their respective storage bins, through pipes to mixing tanks or hoppers. In that, and in comparable environments it is necessary to rapidly and frequently shut off the flow of the particulate material in the pipes through which it passes.

Thus, in the past, a valve in the form of a rubberlike sleeve or tube has been arranged within the flow pipe and surrounded by an outer housing for the application of pressure, such as compressed air or air at a higher pressure than the vacuum normally found within the pipe, to the exterior of the valve tube. This collapses the tube radially inwardly to shut off the flow.

Since such tube valves are normally rapidly and frequently operated, as for example, ten times per minute in a typical application, the rubberlike tubes tend to rapidly fatigue and fail in use. Fatigue failures are particularly aggravated and accelerated because the tube walls generally tend to collapse and bend inwardly around sharply formed bend lines. Thus, in actual use, such tubes may fail within a matter of a few days operation or at most, within a few months operation, requiring frequent replacement.

The invention hereof is particularly concerned with an improvement to such tube valves which substantially increases their useful lives.

SUMMARY OF INVENTION

The invention herein contemplates forming a tube valve in such a way that it progressively collapses, both longitudinally and radially in a curvalinear manner, rather than a long sharp bend, to thereby avoid localized line fatiguing and failure and simultaneously for squeezing the particulate material out of the collapsing portion of the tube to prevent caking or jamming of the tube.

The valve tube herein is generally formed of a uniform outer diameter cylindrically shaped tube divided into an intermediate valving portion and opposite end portions, but with the valving portion having a considerably greater internal diameter than the end portion, that is, being of a considerably thinner wall section. The portions are joined at tapered or concated conical wall sections and three V-shaped ribs are formed integral with the intermediate portion, extending the length thereof and radially inwardly.

Upon application of uniform pressure to the exterior surface of the intermediate or valving portion, it progressively collapses inwardly, between the ribs only, starting at the longitudinal center of the intermediate portion to form three inwardly curved segments which engage near the axis of the tube to shut off flow through the tube.

The progressive collapsing results in avoidance of sharp bend lines and thereby minimizes fatigue.

These and other objects and advantages of this invention will become apparent upon reading the following description of which the attached drawings form a part.

DETAILED DESCRIPTION

Figure 1:
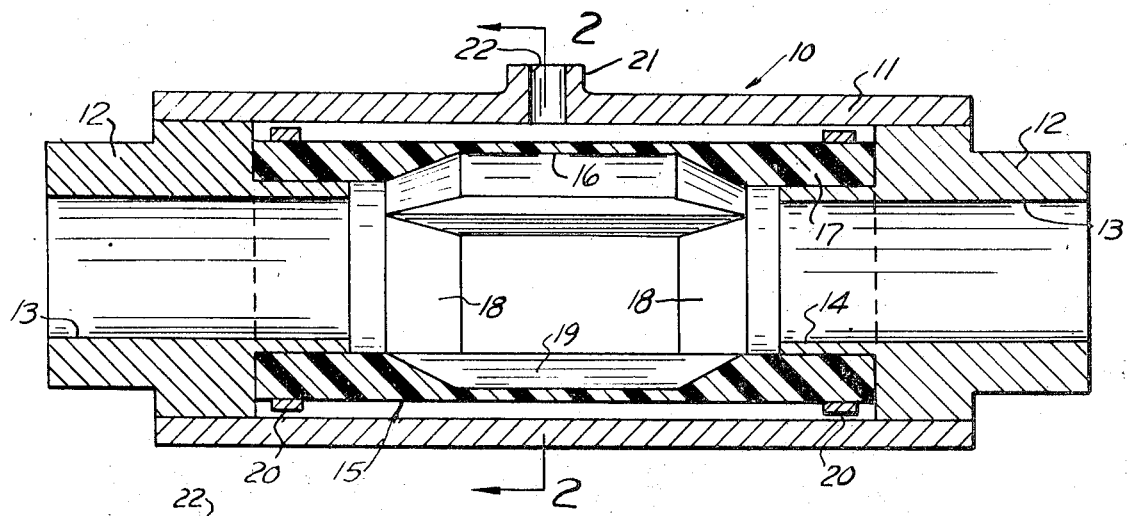
FIG. 1 is an elevational, cross-sectional view of the valve assembly.
Figure 2:
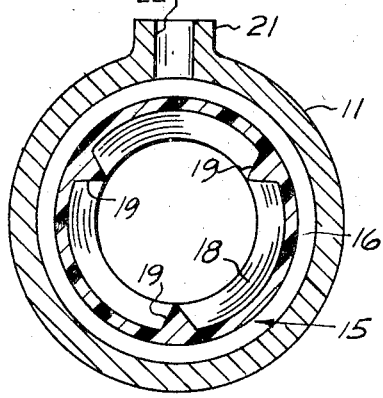
FIG. 2 is a cross-sectional view taken in the direction of arrows 2–2 of FIG. 2.

As shown in FIG. 1, the valve assembly 10 includes a cylindrical or tubular housing 11 whose ends are closed by cylindrical end caps 12 having central flow passages 13 and interior, thin wall sleeves 14. The end caps are normally fastened to the opposite ends of pipes conveying particulate material, such as granular or beaded plastic or the like.

Within the housing, and spaced inwardly therefrom, is the valve tube 15 which is in the form of a uniform outer diameter, circular in cross section, tube formed of a flexible or resilient rubberlike material, such as a suitable plastic as polyethylene.

The tube is divided into three integral portions, namely, a thin wall intermediate valving portion 16 and thick wall end portions 17, with the adjacent portions joined together by tapered or truncated conical shaped sections 18. Thus, the internal diameter of the intermediate portion is considerably greater than that of the end portions and the wall thicknesses of the end portions are at least twice as thick as the thickness of the intermediate portion wall.

Three V-shaped ribs, spaced 120°, are formed integrally upon the inner wall of the intermediate portions, extending radially inwardly and with their apices located along radial planes. These ribs 19 are preferably of a height approximately equal to the difference in wall thicknesses of the intermediate and end portions. That is, their apices are aligned with the inner wall surfaces of the end portions. However, where it is desired to also use the ribs for guiding the flow of the particulate material, they may be made to extend a greater distance radially inwardly of the tube.

The opposite end portions 17 are slipped over the interior sleeve 14 of the end caps and are secured thereto by means of conventional ring clamps 20.

In order to collapse the tube intermediate valving portion, the pressure in the space between the tube and the cylindrical housing 11 is increased. This may be accomplished simply by applying compressed air into the housing through a fitting 21 formed for attachment to a compressed air pipe and having a central air passageway 22. Another method for increasing pressure is simply to maintain the space around the outside of the tube at the same vacuum pressure as that normally used for conveying the material through the pipes, that is, through the tube, and then simply shutting off the vacuum and opening the passageway 22 to atmosphere to thereby create a pressure differential between the outside of the tube and the vacuum within the tube, resulting in rapid collapse thereof.

OPERATION

Figure 3:
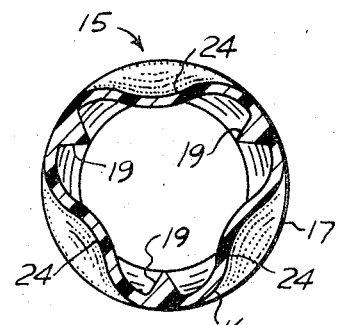
FIG. 3 is a cross-sectional view of the valve tube, per se, taken in the direction of arrows 2–2 of FIG. 1, and shows the tube in its partially collapsed position.

In operation, particulate material is rapidly flowed through the valve until it is desired to shut the valve to stop the flow. At this point, the uniform pressure is applied to the exterior of the tube, as mentioned above, causing the intermediate valving portion to collapse. As illustrated in FIG. 3, the collapse, due to the rib configuration, takes place in the form of three curved segments 24, without any sharp bend lines.

Figure 5:
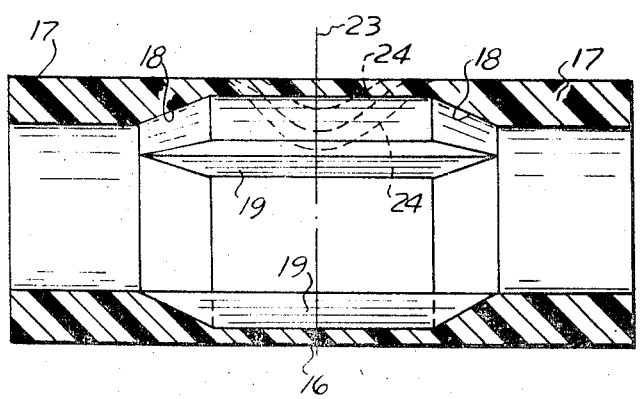
FIG. 5 is an elevational cross section of the tube, per se.

As shown in FIG. 5, because of the differences in wall thicknesses between the portions and the truncated conical shape of the junctures between the portions, the collapsing begins at the longitudinal center line 23 of the tube. In effect, the tube begins to dimple inwardly upon the application of pressure, at three locations centered upon the center line 23, with the collapsing of the segments thus being progressive both longitudinally and radially. FIG. 5 shows this progressive collapse in dotted lines.

Figure 4:
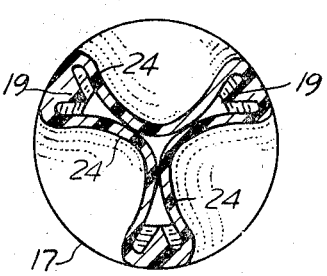
FIG. 4 is view similar to FIG. 3, but showing the tube completely collapsed for shutting off flow.

The segments 24 continue collapsing until they form an approximate or rough line contact with each other, as shown in FIG. 4, with the line contacts being parallel to and closely adjacent to the axis of the tube.

As shown in FIG. 4, the segments need not tightly close off the central area of the tube since the particulate material will tend to close off that portion and the particulate material trapped therein will assist in maintaining the roundness of the peaks of the segments.

The progressive collapsing in the longitudinal direction, tends to squeeze back or force in a longitudinal direction the particulate material flowing through the tube so as to prevent the grasping or clamping of a large slug of particulate material at the center of the tube and thereby compressing this to form a cake which might otherwise jam up the flow when it begins again.

Figure 6:
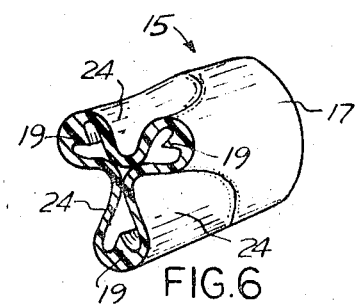
FIG. 6 is a fragmentary, perspective view of the tube.

FIG. 6 illustrates the closure of the segment as it might appear in a cross-sectional view roughly through the longitudinal center line 23. As can be seen, there are no sharp bends and all of the bending of the tube wall portions is done along relatively large radius curves, thus minimizing fatiguing. This form of construction thus increases the life of such a tube as for example at least four times in a typical valving usage.

I claim:

1. A pressure operated valve for controlling the flow of dry particulate materials comprising:

an elongated, circular cross section, uniform outer diameter tube formed of a flexible rubberlike material;

said tube being formed into three integral portions, namely, an elongated, intermediate valving portion and elongated opposite end portions, with the end portion walls being at least twice as thick as the intermediate portion wall thickness, so that the internal diameter of the intermediate portion is considerably greater than the internal diameter of the end portions, and the junctions between the inner wall surfaces of the intermediate and the respective end portions being formed as a gradual taper defining truncated conical shapes;

three radially inwardly extending V-shaped cross section ribs formed integral with the inner wall surface of the intermediate portion and extending the full length thereof parallel to the axis of the tube, with the ribs being equally spaced apart and their apices each being located along a radial plane of the tube; and the wall of the intermediate portion progressively collapsing inwardly both longitudinally and radially starting at the longitudinal center of the intermediate portion and centrally between the ribs, upon application of uniform pressure to the exterior of the intermediate portion, to form three rounded, inwardly extending wall segments, with no sharp bend lines, until all three segments form roughly line contacts with each other along lines close to and parallel to the tube axis for shutting off the flow of dry particulate material passing through the tube, and wherein the progressive longitudinal collapsing squeezes such material longitudinally away from the longitudinal center of the intermediate portion for minimizing trapping such material between the segments.